No. 694,560. Patented Mar. 4, 1902.
W. S. LIVENGOOD.
WHEELED SCRAPER.
(Application filed July 1, 1901.)
(No Model.) 2 Sheets—Sheet 1.

Witnesses
A. E. Brown
O. A. Lucas

Inventor
W. S. Livengood
by J. S. Brown
Attorney

THE NORRIS PETERS CO., PHOTO-LITHO., WASHINGTON, D. C.

No. 694,560. Patented Mar. 4, 1902.
W. S. LIVENGOOD.
WHEELED SCRAPER.
(Application filed July 1, 1901.)
(No Model.) 2 Sheets—Sheet 2.
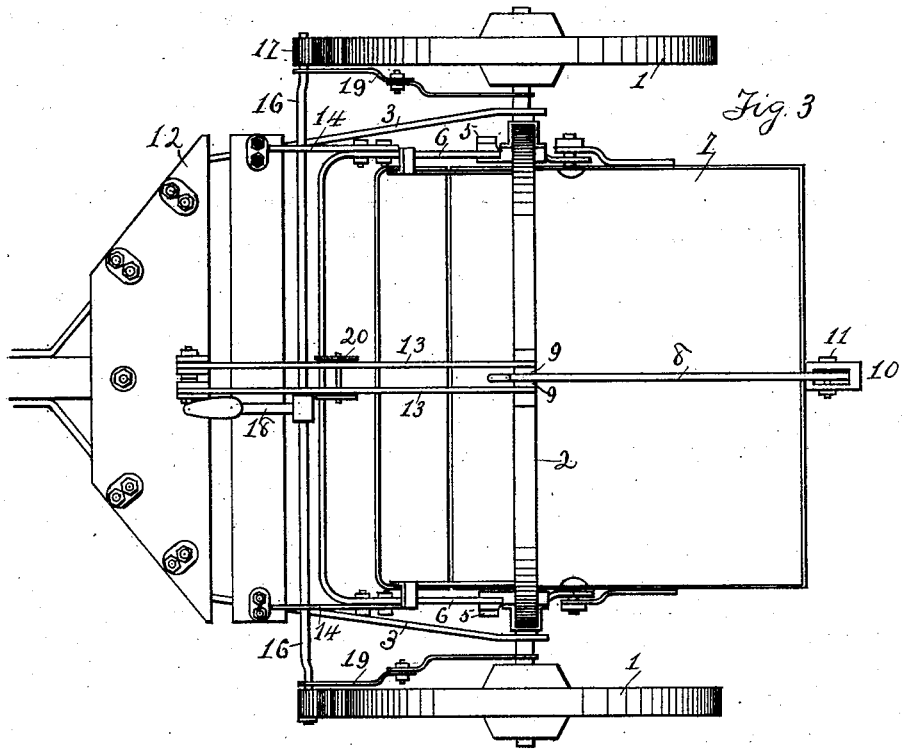
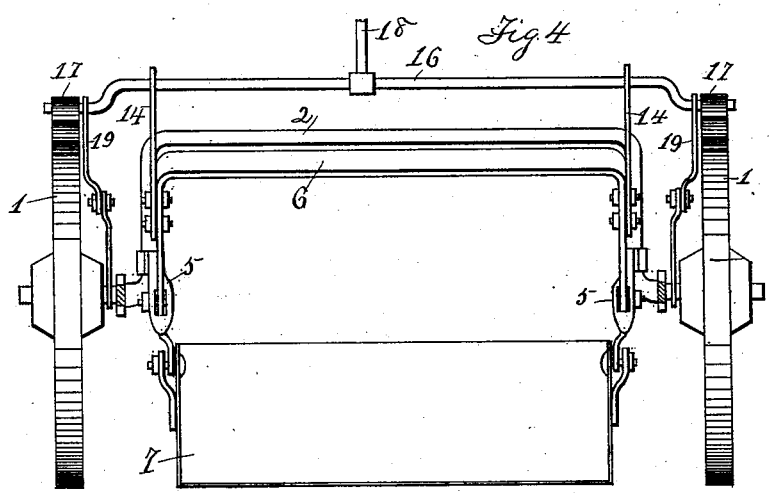
Witnesses
A. B. Brown
O. A. Lucas
Inventor
W. S. Livengood
by T. S. Brown
Attorney
THE NORRIS PETERS CO., PHOTO-LITHO., WASHINGTON, D. C.

UNITED STATES PATENT OFFICE.

WINFIELD S. LIVENGOOD, OF KANSAS CITY, MISSOURI, ASSIGNOR TO SMITH & SONS MANUFACTURING COMPANY, OF KANSAS CITY, MISSOURI, A CORPORATION OF MISSOURI.

WHEELED SCRAPER.

SPECIFICATION forming part of Letters Patent No. 694,560, dated March 4, 1902.

Application filed July 1, 1901. Serial No. 66,767. (No model.)

*To all whom it may concern:*

Be it known that I, WINFIELD S. LIVENGOOD, a citizen of the United States, and a resident of Kansas City, in the county of Jackson, in the State of Missouri, have invented certain new and useful Improvements in Wheeled Scrapers, of which the following is a full, clear, and exact description, reference being had to the accompanying drawings, which form a part of this specification.

My invention relates to improvements in wheeled scrapers, having more particular relation to providing certain devices and arrangement of devices by which the raising of the loaded scraper is facilitated.

In the operation of wheeled scrapers as heretofore constructed, in which the scraper-pan or scoop is carried upon a bail mounted upon or connected with the axle, it has required the combined strength of two or more men applied upon the hand-lever connected with the bail to raise the loaded pan into position for carrying. In a wheeled scraper constructed according to and embodying my invention by the application of a brake upon the wheels of the scraper the loaded pan is raised by the draft of the team moving the wheels forward, and thus the operation and working of the scraper is very greatly facilitated.

To accomplish such and other purposes, my invention consists in certain features of novelty hereinafter described, and pointed out in the claims.

Figure 1:
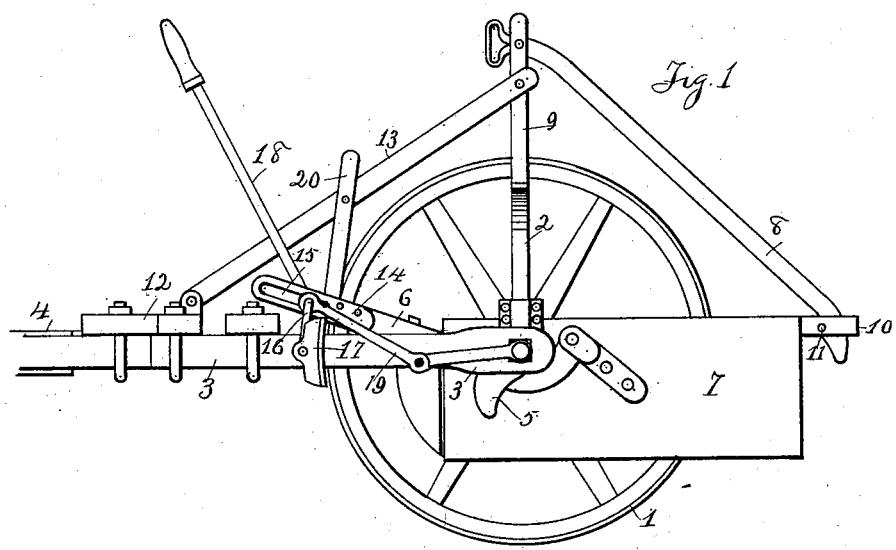
Figure 2:
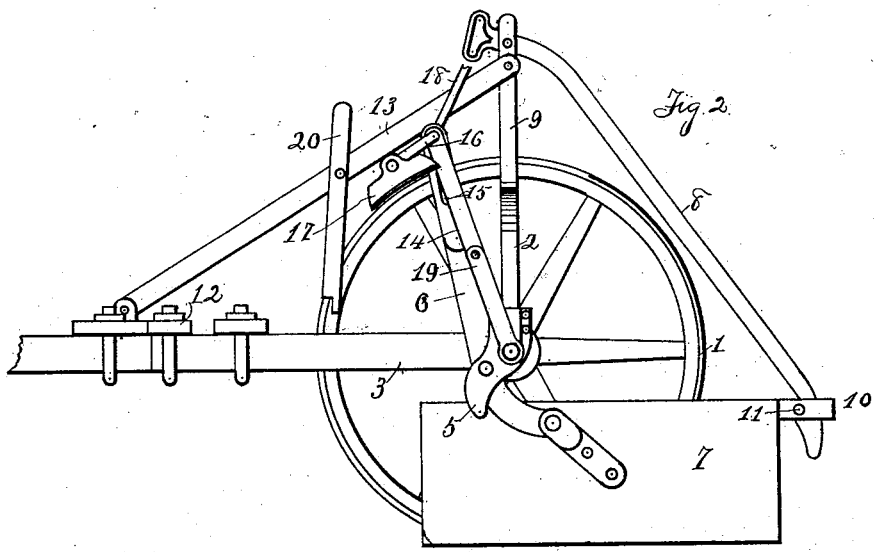

Figure 1 represents a side elevation of a wheeled scraper embodying my invention, with the scraper-pan elevated to the position in which the load is carried, one of the wheels being removed to permit a view of the working parts. Fig. 2 represents a side elevation of such scraper with the scraper-pan let down to take a load. Fig. 3 represents a plan view of such wheeled scraper. Fig. 4 represents a front elevation of such wheeled scraper, showing the relation of the bail and brake-rod.

Similar numerals refer to similar parts throughout the several views.

1 represents the carrying-wheels of a wheeled scraper, mounted upon an arched axle 2. Upon said axle, adjacent to the wheels, are mounted draft-bars 3, which extend forward and are connected with a draft-pole 4, as in the usual construction. Upon said axle are secured brackets 5, in which is mounted a bail 6, and upon said bail is carried the scraper-pan 7. Said scraper-pan is supported at its rear end by a brace-bar 8, pivotally mounted upon standards 9, secured upon the axle, and slidingly engaging a slotted block 10, secured upon the rear of the scraper-pan, a hook being provided near the end of said bar and arranged to engage a pin 11, passing through said block. This being familiar construction is not shown in detail. A platform 12 is mounted upon said draft-bars 3, and brace-bars 13 connect said platform with said standards 9.

In the usual construction a hand-lever is mounted upon or connected with the bail carrying the scraper-pan, and when the pan has been let down and loaded it requires the very strenuous effort of two men to raise the loaded pan. To obviate this serious objection and provide relief from this arduous work, in my improved scraper extensions 14 are mounted upon said bail 6 and provided with slots 15. In said slots is mounted a brake-rod 16, carrying brake-blocks 17, arranged to bear and form a brake upon the wheels, and upon said brake-rod is fixedly mounted a hand-lever 18. Links 19 connect said brake-rod with the axle, being preferably connected with said brake-rod adjacent to the wheels, as shown in Figs. 3 and 4, their purpose being to control and limit the movement of the bail and brake-rod and prevent them passing too far over the wheels and also to control the engagement of the brake-blocks with the wheels and to provide a stay to prevent rotation of the brake-rod when the hand-lever 18 is pressed backward to lower the scraper-pan. Now when the scraper-pan is let down and loaded, as shown in Fig. 2, by applying the brakes the bail is locked to the wheels, and then as the team draws the machine forward the wheels will move forward and the leverage upon the bail will raise the loaded pan to carrying position, as shown in Fig. 1, and when the pan is elevated latch-bars 20, pivotally mounted upon said brace-bars 13, are arranged to engage the bail and retain the pan in position. By such construction the force required to raise the loaded pan is supplied by the team and not by the manual labor of attendants, it requiring but little effort to apply the brakes to a sufficient degree to effect the raising of the pan.

Having thus fully described my improvements, what I claim as my invention, and desire to secure by Letters Patent, is—

1. In a wheeled scraper having its pan carried by a bail suspended from the axle, a brake-rod carried by said bail, and provided with brake-blocks arranged to engage and lock said bail upon the wheels, whereby as the wheels move forward said pan will be raised to carry the load; substantially as set forth.

2. In a wheeled scraper having its pan carried by a bail suspended from the axle, and provided with a brace-bar supporting the rear of the pan, extensions mounted upon said bail, a brake-rod mounted in said extensions, brake-blocks mounted upon said rod, and arranged to engage said wheels, a hand-lever upon said rod for operating said brakes, and links connecting said brake-rod with the axle; substantially as set forth.

3. In a wheeled scraper the combination with the truck comprising the wheels and axle, the draft-bars connected with the axle, the platform mounted upon said draft-bars, the standards mounted upon the axle, and the forward brace-bars connected with said standards and with said platform, of a scraper-pan, a bail suspended from the axle upon which said pan is carried, a brace-bar pivotally connected with said standards and arranged to support the rear of said pan, slotted extensions mounted upon said bail, a brake-rod mounted in said extensions, brake-blocks on said rods arranged to engage said wheels, links connected with said brake-rod and with the axle, a hand-lever mounted upon said brake-rod for operating the brakes, and a latch-lever mounted upon said forward brace-bars and arranged to engage said bail to retain said pan in elevated position; substantially as set forth.

4. In a wheeled scraper having suitable wheels and axle, the combination of a scraper-pan, a bail suspended from the axle and carrying said pan, a brake-rod carried by said bail, and provided with brake-blocks arranged to engage the wheels, and a hand-lever on said brake-rod for operating the same; substantially as set forth.

5. In a wheeled scraper having its pan carried by a bail suspended from the axle, a brake mechanism connected with said bail, and arranged to be applied upon the wheels, whereby the loaded pan is raised by the forward movement of the wheels; substantially as set forth.

WINFIELD S. LIVENGOOD.

Witnesses:
Wm. J. Smith,
O. A. Lucas.